United States Patent [19]

Perez

[11] Patent Number: 4,693,447
[45] Date of Patent: Sep. 15, 1987

[54] MOTORIZED GATE VALVE FOR A WASTE DISPOSAL SYSTEM

[75] Inventor: Frederick W. Perez, San Clemente, Calif.

[73] Assignee: Kaiser Aerospace & Electronics Corporation, Oakland, Calif.

[21] Appl. No.: 908,003

[22] Filed: Sep. 16, 1986

[51] Int. Cl.4 .......................... F16K 3/04; F16K 31/04
[52] U.S. Cl. ................. 251/129.12; 251/174; 251/328; 4/323
[58] Field of Search ................... 251/328, 129.12, 170, 251/174; 4/323

[56] References Cited

U.S. PATENT DOCUMENTS

| | | | |
|---|---|---|---|
| 2,943,706 | 7/1960 | Morgan | 251/129.12 X |
| 3,333,816 | 8/1967 | Williams et al. | 251/328 X |
| 3,801,991 | 4/1974 | Fulton et al. | 4/323 |
| 4,257,447 | 3/1981 | Clarkson | 251/174 X |

*Primary Examiner*—Arnold Rosenthal
*Attorney, Agent, or Firm*—Marvin H. Kleinberg; Matthew F. Jodziewicz

[57] ABSTRACT

Gate valve means connected in a waste pipe system have a hollow housing with an inlet and an outlet connected to the waste pipe system. A blade is disposed in the housing at a substantially right angle to the waste pipe system and is selectively movable between a closed position blocking the inlet from the outlet, and an open position allowing waste flow between the inlet and outlet. The blade moves between the open and closed positions and a pair of seals are disposed in the housing in an abutting relationship aligned to receive the blade therebetween when in the closed position and to seal waste flow between the inlet and outlet from the interior of the housing when the blade is in the open position. Each of the pair of seals has a unique design enabling it to mechanically rotate with the blade, thereby limiting wearing forces thereon.

9 Claims, 5 Drawing Figures

MOTORIZED GATE VALVE FOR A WASTE DISPOSAL SYSTEM

BACKGROUND OF THE INVENTION

1. Field of the Invention

This invention relates in general to gate valves, and, more particularly, to a motorized gate valve that can be used as a flush valve in an aircraft waste disposal system, including those systems in which a pressure differential exists between the two sides of the valve.

2. Description of the Related Art

In recent years, efforts have been urdertaken to replace the recirculating waste disposal systems found on vehicles with non-recirculating systems that utilize an on board supply of flushing liquid, usually potable water. For many years, the recirculating waste disposal svstems have been utilized primarily to eliminate the need to carry extra liquid that would be needed for flushing. The recirculating waste disposal system started with a small pre-charge of flushing fluid and utilized any added liquid waste in the flushing process.

As a result of some effort, waste disposal systems have been developed that require only minimal amounts of liquid in the flushing process. These systems permit use of an on-board potable water supply as a source of flushing fluid without imposing severe weight and/or storage penalties. Because the amount and volume of flushing fluid can be small, it is important to have a flush valve that will quickly open and close over a large orifice so that the waste matter will move out of the toilet unit and into the waste line rapidly.

For those waste disposal systems that utilize a pressure differential between the environment of the toilet unit (normally at aircraft cabin pressure) and the exterior of the aircraft in flight, the flush valve must also provide a pressure seal to preserve the pressure differential and to avoid depressurization of the cabin when closed.

Some prior art valves, as in U.S. Pat. No. 4,199,828 to Hellers, have utilized a weighted flapper which opens when the weight of the waste matter and the pressure differential overcome the weight biasing the valve closed.

Other valves have been designed with a diaphragm which occludes a bend in the waste line and acts as a seal, effectively separating the higher pressure toilet unit from the lower pressure waste tank. One such valve is shown in U.S. Pat. No. 4,376,315 to Badger et al.

The diaphragm pinch valve, which is the essence of the Badger et al invention, preferably utilizes a major bend of goose neck shape or trap in the waste discharge line. While in fact diaphragm pinch valves as suggested by Badger et al have been constructed in a straight section of a waste discharge line, such valves are highly susceptible to damage (especially the flexible diaphragm member) from objects impinging on them as waste material is drawn through the valve.

Further, in waste disposal systems utilizing minimal amounts of flushing fluid, the use of a trap would hold waste products in proximity to the toilet unit of the system. In aircraft systems and in vacuum systems generallv, it is preferable to have a direct waste line to the storage tank and it would be advantageous to have a substantially straight, gravity assisted line.

The present invention overcomes the tendencies of these Badger et al type of pinch valves to be damaged by the internal flow of waste materials therethrough by having a relatively short, straight passage directly through the valve with no exposed seals or diaphragms. Accordingly, the passage of objects that would normally damage a Badger et al type of valve would have no effect on a valve made in accordance with the present invention.

In order to provide a waste line that is suitable for low volume flush aircraft systems and one that could easily accommodate a vacuum assisted flushing process, a flush valve is necessary that can maintain a pressure differential when closed and that can quickly open and close a wide aperture so that when the toilet unit of the system is flushed and the waste oroducts and flushing fluid accumulate at the valve, a quickly opened and closed valve can let the pressure differential carry the waste products into the main waste line.

Finally, it should be noted that most prior art valve seals used in gate valves are of the "O" ring or spring loaded type. None of these prior art seals have sufficient comoliance to allow the seal to seal on itself and still not have so much static friction that the sliding gate cannot be withdrawn, without a large driving device from between the seals with the valve in the closed position. Also, currently used prior art seals undergo severe wearing forces and must be reolaced on a regular basis.

The present invention overcomes these noted problems in the prior art seals used in waste system motorized gate valves by disclosing (and claiming) a seal having a design permitting the seal, of rubber-like flexure, to mechanically rotate as the slide gate is moved into the valve closed position, inserted between the seals. As the slide gate is moved to its open position, that is, withdrawn from between the seals, the natural resilience of the elastomer in the seals along with the design of the seals, causes each seal to rotate back mechanically to its original position, each resiliently biased against the other, sealing the passing waste products from entry into the valve housing. This is necessary as the accumulation of waste products in the valve housing is unacceptable from a sanitary standpoint.

Since the seals mechanically rotate in association with the slide gate, the seals experience little to no wearing forces and have a considerably longer life expectancy than prior art seals.

SUMMARY OF THE INVENTION

According to the present invention, a motor driven, reversible gate valve is provided between the toilet unit and the main waste line. The valve itself has a blade that moves at right angles to the waste line and, in when in a closed position, completely blocks the waste line. A reversible motor drives the valve between its open and closed positicns. Limit switches can signal the motor to reverse directions.

A seal of novel configuration is also disclosed which seals the interior of the valve body from the waste products passing through the valve when the blade is in the open position. Also, when in the closed position, the seals engage the blade surface, preventing any leakage either around the blade, or into the valve housing.

The seals are mounted in a groove in the valve body, and include a design having a reverse curve (concave portion) in a side wall that permits the seal to partially collapse upon itself in a mechanical rotation to accommodate the width of the blade.

In the event of a power failure or a motor problem, the valve mechanism can be manually actuated to either open or close the valve. Normally, however, an electrical motor will operate the valve blade, driving it in a first direction until a limit switch is engaged. At that point, the motor will stop until signaled to start again in the opposite direction, or, it can be immediately reversed until the other limit is reached and an entire cycle of closed, open and closed (a flush cycle) is completed.

In operation in a vacuum assisted, low volume, aircraft waste disposal system, actuating a flush button or lever after using the toilet will cause a pre-measured quantity of flushing fluid to clean the contents of the bowl and carry the mixture to the gate valve. A slight delay can be provided between actuating the flush button and opening the valve so that the valve does not actuate until the flushing action of the flushing fluid is complete and the contents of the toilet unit are washed down to the area of the gate valve.

After a delay suitable to assure that the entire contents of the toilet unit, including the flushing fluid, are out of the toilet unit and adjacent the gate valve, the valve motor is energized and the valve is opened beginning its cycle. Waste matter, mixed with the flushing fluid, is propelled toward the waste tank under the differential pressure that exists between the cabin and the exterior of the aircraft. In some embodiments, the waste matter has the assistance of gravity, as well, to aid in the move toward a main waste collecting tank.

After a pre-determined pause (which may be no pause at all), the valve motor is reversed and the gate valve closes, restoring the pressure differential and readying the toilet unit for reuse. Reversal of the valve motor may be automatically regulated by the use of limit switches as suggested above.

Operation on the ground, in the absence of a pressure differential is still practical if there is a gravity assist available. Also, a fluid assist can be provided by using fluid jets to propel the wastes.

The novel features of construction and operation of the invention will be more clearly apparent during the course of the following description, reference being had to the accompanying drawings wherein has been illustrated a preferred form of the device of the invention and wherein like characters of reference designate like parts throughout the drawings.

DESCRIPTION OF THE PREFERRED EMBODIMENTS

Figure 1:
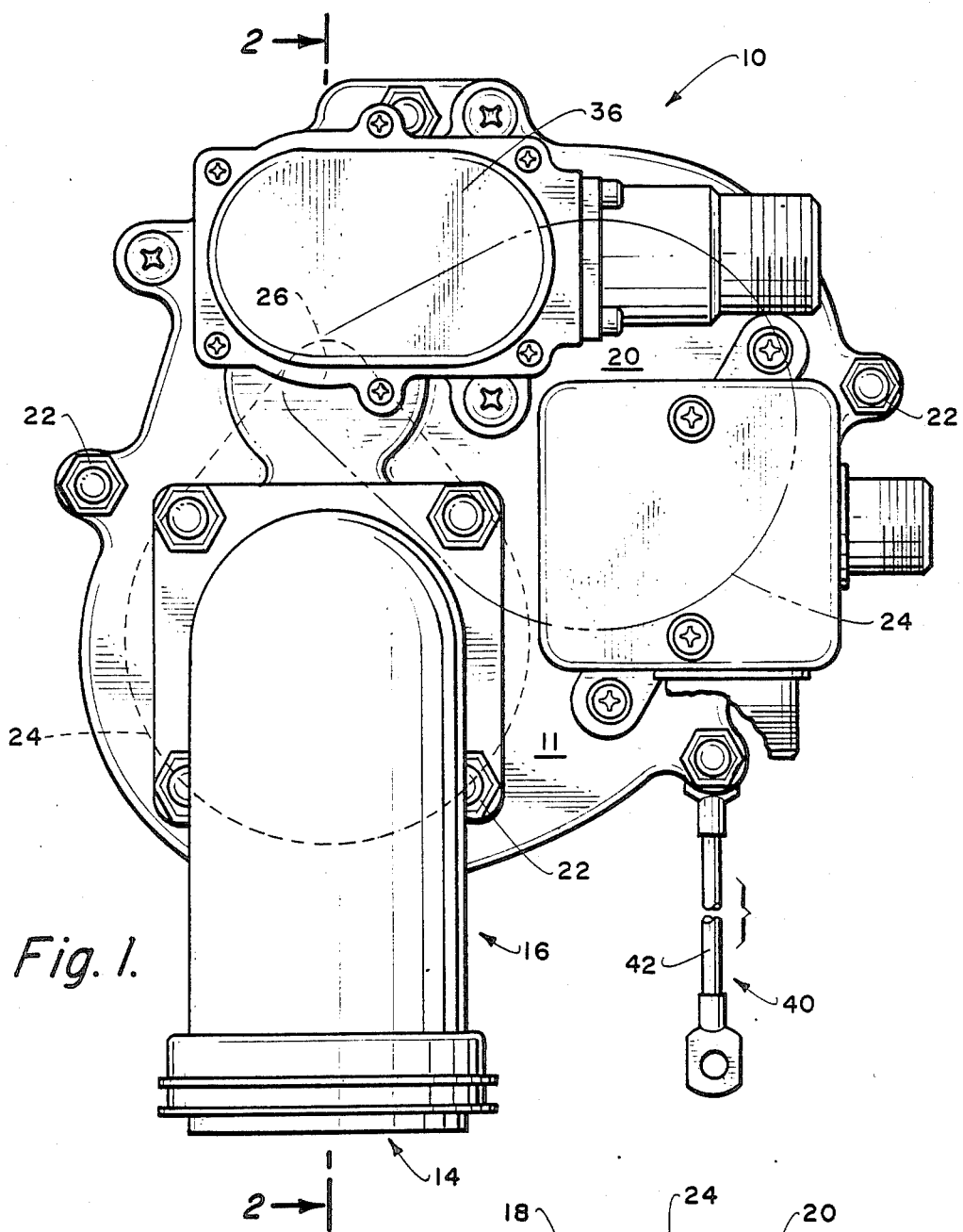
FIG. 1 is a plan view of a motorized gate valve embodying the invention claimed herein.

FIG. 1 illustrates the general appearance of a motorized gate valve 10 constructed in accordance with the invention disclosed and claimed herein. All the unnecessary detail of the waste disposal system associated with the motorized gate valve has been deleted from the drawings for ease of understanding the present invention.

Figure 2:
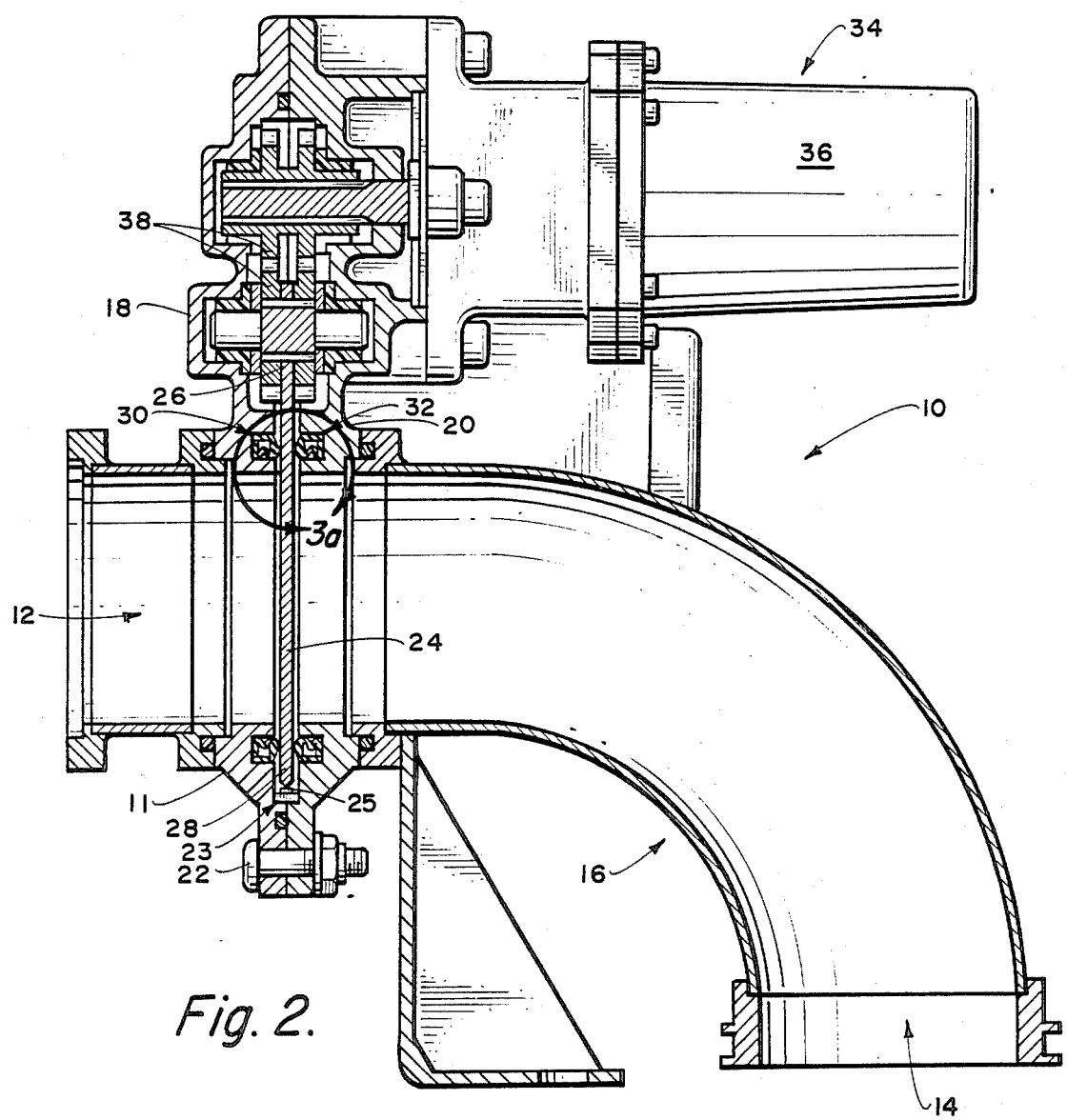
FIG. 2 is a view taken along the line 2—2 of FIG. 1 in the direction of the appended arrows.

In a waste disposal system including a receptacle for receiving waste, a holding chamber for the waste and a waste pipe system communicating between the receptacle and the holding chamber through which waste can be transferred therebetween, the invention is illustrated in FIGS. 1 and 2 as being embodied in a motorized gate valve 10 that includes a hollow housing 11 with an inlet 12 and an outlet 14 connected to the waste pipe system 16. In a preferred embodiment for ease of maintenance and manufacture, hollow housing 11 is made of two mating sections 18, 20, joined by a plurality of nut and bolt combinations 22.

A teardrop shaped blade 24 is pivotally connected at one end 26 to the interior of housing 11. Teardrop shaped blade 24 expands on an opposite end 28 to a diameter sufficiently large to engage a pair of seals 30, 32 (described below), and block waste flow between inlet 12 and outlet 14.

Blade 24 is selectively movable between a closed position blocking and sealing inlet 12 from outlet 14, and an open position allowing waste flow through the inlet 12 and outlet 14. Both the open and closed positions of the blade 24 are shown in dotted outline in FIG. 1.

Electric motor means 34 include a reversible electric motor 36 operatively connected to blade 24 through gear means 38. Gear means 38 are a series of gears adapted to selectively move blade 24 between the open and closed positions.

In a preferred construction, a serrated gear can be formed in end 26 of blade 24 for pivotally connecting blade 24 in the interior of hollow housing 11. Thus, a reduction in parts can be accomplished by this construction.

Sensing and control means 23 are operatively connected to blade 24 and electric motor means 34 for sensing the open or closed positions of the blade 24 and may cause reversal and shut-off of the electric motor means 34 based thereon. Preferably such sensing and control means include at least one limit switch 25 placed to be activated whenever blade 24 reaches its extremes of pivoted travel, i.e., the open or closed positions. Additional limit switches can be disposed with regard to blade 24 so that one would sense whenever blade 24 was in the open position for automatically reversing electric motor 36, thereby driving blade 24 back into its closed position. A second limit switch could be disposed to sense when blade 24 had reached its closed position and shut-off electric motor 36.

Manually activated means 40 for selectively moving the blade 24 between the open and closed positions is provided by a cable or hard linkage system 42 that can be operated by a user. The manual system of opening and closing blade 24 is a back-up safety system which is provided for the case of failure of the automatic electrical system described above.

Seals 30 and 32 (mentioned above) are a pair of annular seals best illustrated in FIGS. 2 and 3a through 3c. These seals have an angled, hollow, D-shaped cross-section with a gap 44 between ends 46 and 48 and a reverse curve (concave portion) 50 in a side wall 52. It is the shape of seals 30 and 32 that permits the gate valve of the present invention to operate with great efficiency and overcome prior art problems.

Figure 3C:
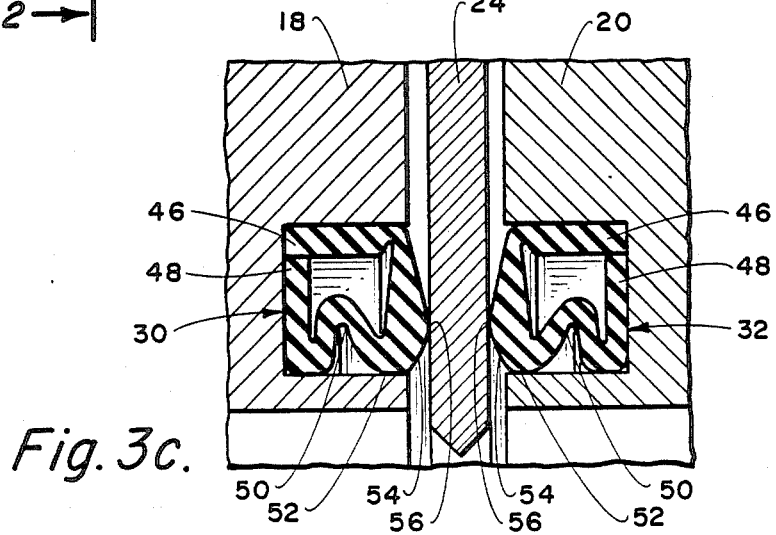
FIGS. 3b and 3c illustrate the mechanical rotation of the seals of in FIG. 2 when the motorized gate valve of FIG. 1 goes through an operational cycle.
Figures 3A, 3B:
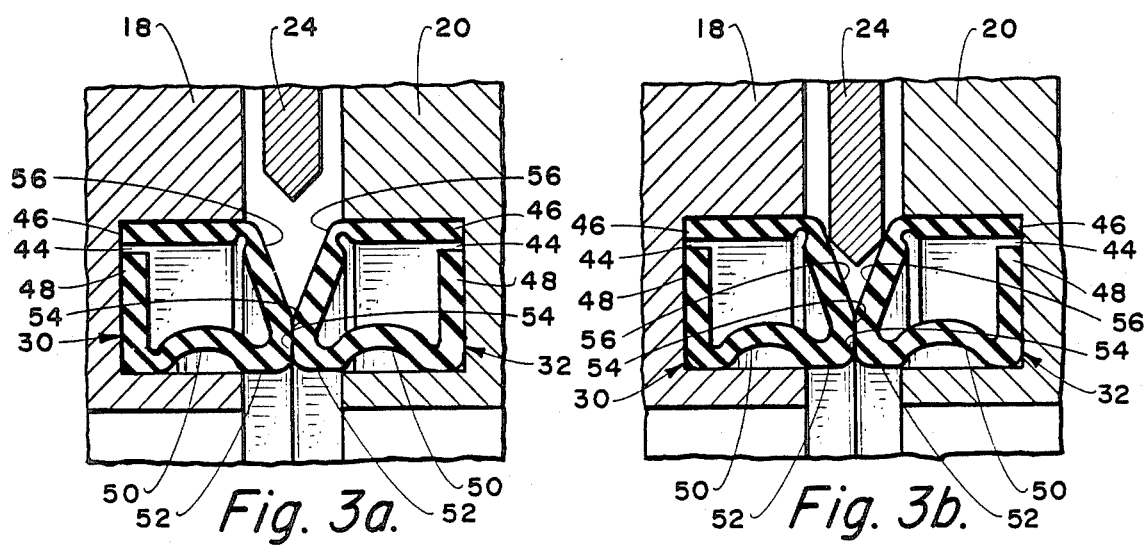
FIG. 3a is an enlarged view of the area contained within the circular line 3a of FIG. 1 prior to the blade of the invention engaging the seals as shown in FIGS. 3b and 3c described below.

Specifically, the sealing action between blade 24 and seals 30 and 32 does not depend wholly upon the elastomeric sealing properties of seals 30 and 32, but, to a great extent results from the mechanical rotation of the seal, allowing the seals to rotate in on themselves and out of the way of blade 24 as blade 24 enters between the seals, as best illustrated in FIGS. 3a, 3b and 3c. The shape of seals 30 and 32 permits the seals to function over an extended time period without failure as the portions of the seals that contact with blade 24 do so in a "rolling" and "wiping" fashion, thus virtually eliminating the wearing or abrasion of meeting parts against conventional "O" ring seals which are in compressive frictional engagement. Likewise, seals 30 and 32 retain their flexibility and longevity without incorporating any metallic elements, which would tend to corrode in the environment of a waste disposal system.

To clarify the mechanical rotation of seals 30 and 32, reference is made to FIGS. 3a through 3c.

FIG. 3a shows the relationship of blade 24 and seals 30 and 32 prior to blade 24 engaging the seals 30, 32. In this "pre-entry" position, seals 30 and 32 abut one another along side 54, forming a seal against the entry of undesirable waste material into the interior of valve housing 11. Because the concave sections are partly collapsed, the elastic restoring force biases the seals into a sealing engagement.

FIG. 3b shows blade 24 as it initially engages seals 30 and 32, and the forces exerted on the seals to cause a mechanical rotation of seals 30 and 32 in response to the lateral movement of blade 24. As is illustrated in FIG. 3c, seals 30 and 32 fold along side wall 52 in a mechanical rotation to produce a sealing effect with angled surface 56 parallel to the blade 24 as indicated.

Similarly, when blade 24 is withdrawn from between seals 30 and 32, FIG. 3c, a reverse mechanical rotation of the seals occurs and the seals resume the shapes as seen in FIG. 3a.

In operation in association with a waste disposal system, the above described motorized gate control valve embodying the invention would be activated by a user actuating a flush button or lever after using the toilet unit of the system. The flush button or lever causes the electric motor 36 to begin to drive the blade member 24 of the valve 10 from its closed position to the open position after the flushing fluid is delivered to the toilet unit Once the limit switches sensed that the blade member 24 was in the "open" position, they would cause the electric motor 36 to reverse and to drive the blade 24 into the "closed" position. Another limit switch would sense when the blade 24 had moved into the "closed" position and shut the motor 36 off.

A slight delay can be programmed into the actuation system for the electric motor 36 so that any waste matter placed into the system would be given sufficient time to reach the closed valve prior to its beginning its operating cycle. Such a delay, not necessary in all cases, would insure that slow moving waste matter was not trapped on the wrong side of the gate valve.

In operation, the blade member 24 forms a tight seal against the seals in the "closed" position to prevent leakage of waste matter into the interior of the hollow housing 11 and prohibits pressurized cabin air from exhausting to the outside. In the open position, the seals abut against one another in such a manner as to provide a fluid tight seal against any waste matter from entering into the interior of the hollow housing 11. Thus, the interior of the hollow housing 11 and valve component parts contained therein are kept free of foreign matter that might cause maintenance problems were it to enter the interior of the hollow housing.

The invention described above is, of course, susceptible to many variations, modifications and changes, all of which are within the skill of the art. It should be understood that all such variations, modifications and changes are within the spirit and scope of the invention and of the appended claims. Similarly, it will be understood that it is intended to cover all changes, modifications and variations of the example of the invention herein disclosed for the purpose of illustration which do not constitute departures from the spirit and scope of the invention.

I claim:

1. In a waste disposal system including a receptacle for receiving waste, a holding chamber for the waste and a waste pipe system communicating between the receptacle and the holding chamber through which waste can be transferred therebetween, the improvement comprising:

valve means connected in the waste pipe system having a hollow housing with an inlet and an outlet connected to the waste pipe system;

a blade disposed in said housing at a substantially right angle to the waste pipe system and selectively movable between a closed position blocking said inlet from said outlet, and an open position allowing flow between said inlet and outlet;

means for selectively moving said blade between the open and closed positions;

a pair of seals disposed in said housing in an abutting relationship aligned to receive therebetween said blade when in the closed position and to seal flow through said inlet and outlet from the interior of said housing when said blade is in the open position;

each of said seals being formed from a resilient elastomer and having a generally D-shaped cross-section with a hollow interior and a gap thereinto, one side wall of each seal having a concave portion adapted to permit said seal to pivot and collapse inwardly into its hollow interior in a mechanical rotation of said seals as said blade is inserted therebetween.

2. The improvement of claim 1 wherein said pair of seals comprises a pair of seals each disposed in an annular channel circumferentially surrounding said inlet and outlet in the interior of said hollow housing;

each seal having a flat portion abutting the other seal to seal flow between said inlet and outlet from the interior of said hollow housing and of sufficiently compressible material to receive therebetween said blade when in the closed position.

3. The improvement as in claim 1 wherein said blade is a flat plate of metal, pivotally connected at one end to said housing and expanding on an opposite end to a diameter sufficiently large to engage said seals and block flow between said inlet and outlet.

4. The improvement as in claim 1 wherein the means for selectively moving said blade between the open and closed positions comprises:

electric motor means operatively connected to said blade by gear means adapted to selectively move said blade between the open and closed positions.

5. The improvement as in claim 4 further including sensing and control means operatively connected to said blade and said electric motor means for sensing either the open or closed positions of said blade and causing reversal and shut-off of said electric motor means based thereon.

6. The improvement as in claim 5 wherein said sensing and control means includes limit switches operatively connected to said blade and electric motor means.

7. The improvement as in claim 4 wherein said electric motor means drives said blade throuoh less than a ninety degree arc in the interior of said hollow housing.

8. The improvement as in claim 1 further including manually activated means for selectively moving said blade between the open and closed positions.

9. In a waste disposal system including a receptacle for receiving waste, a holding chamber for the waste and a waste pipe system communicating between the receptacle and the holding chamber through which waste can be transferred therebetween, the improvement comprising:

valve means connected in the waste pipe system having a hollow housing with an inlet and an outlet connected to the waste pipe system;

a blade, pivotally connected at one end to the interior of said housing at a substantially right angle to the waste pipe system and expanding on an opoosite end to a diameter sufficiently large to engage a pair of seals and block waste flow between said inlet and outlet, said blade being selectively movable between a closed position occluding said inlet and said outlet, and an open position allowing waste flow through said inlet and outlet;

electric motor means including gear means operatively connected to said blade by gear means adapted to move said blade selectively between the open and closed positions;

sensing and control means operatively coupled to said blade and electric motor means for sensing either the open or closed positions of said blade and causing reversal and shut-off of said electric motor means based thereon;

manually activated means operatively connected to said blade for selectively moving said blade between the open and closed positions; and a pair of seals disposed in annular channels circumferentially surrounding said inlet and outlet in the interior of said hollow housing, each seal having a flat portion aligned and abutting the other seal to prevent waste flow between said inlet and outlet from entering the interior of said hollow housing when said blade is in the open position and of sufficiently compressible material to receive therebetween said blade when in the closed position;

each of said seals formed from a resilient elastomer and having a generally D-shaped cross-section with a hollow interior and a gap thereinto, one side wall of each seal having a concave portion adapted to permit said seal to collapse inwardly into its hollow interior in a mechanical rotation of said seal as said blade is inserted therebetween.

* * * * *